(12) United States Patent
Akiyoshi

(10) Patent No.: US 10,274,777 B2
(45) Date of Patent: Apr. 30, 2019

(54) DISPLAY DEVICE, METHOD FOR MANUFACTURING DISPLAY DEVICE AND COLOR FILTER SUBSTRATE

(71) Applicant: Japan Display Inc., Minato-ku (JP)

(72) Inventor: Muneharu Akiyoshi, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/666,853

(22) Filed: Aug. 2, 2017

(65) Prior Publication Data

US 2018/0039130 A1 Feb. 8, 2018

(30) Foreign Application Priority Data

Aug. 5, 2016 (JP) ................. 2016-154357

(51) Int. Cl.
| | |
|---|---|
| *G02F 1/1335* | (2006.01) |
| *G02F 1/1362* | (2006.01) |
| *G02F 1/1333* | (2006.01) |
| *G02F 1/1368* | (2006.01) |

(52) U.S. Cl.
CPC ...... *G02F 1/133514* (2013.01); *G02F 1/1362* (2013.01); *G02F 1/1368* (2013.01); *G02F 1/133345* (2013.01); *G02F 1/133512* (2013.01); *G02F 1/136286* (2013.01); *G02F 2001/13685* (2013.01); *G02F 2001/136222* (2013.01); *G02F 2201/121* (2013.01); *G02F 2201/123* (2013.01)

(58) Field of Classification Search
CPC ............. G02F 1/133514; G02F 1/1362; G02F 1/136286; G02F 1/133345; G02F 1/133512; G02F 1/1368; G02F 2001/136222; G02F 2201/121; G02F 2001/13685; G02F 2201/123; G02F 1/136209; G02F 1/13473; G02F 1/133371; G02F 2001/136218; H01J 11/44; H01J 2211/444; H01J 2329/323; H01J 29/327
USPC .................................. 349/106–111
See application file for complete search history.

(56) References Cited

U.S. PATENT DOCUMENTS

| | | | | |
|---|---|---|---|---|
| 6,147,730 | A * | 11/2000 | Budd ..................... | G02B 5/201 349/106 |
| 2003/0025857 | A1* | 2/2003 | Ochiai .............. | G02F 1/133371 349/106 |
| 2004/0239838 | A1* | 12/2004 | Lai ........................ | G02F 1/1368 349/106 |
| 2006/0139515 | A1* | 6/2006 | Baek ...................... | G02B 5/201 349/106 |

(Continued)

FOREIGN PATENT DOCUMENTS

JP  2014-077925  5/2014

*Primary Examiner* — Shan Liu

(74) *Attorney, Agent, or Firm* — Oblon, McClelland, Maier & Neustadt, L.L.P.

(57) ABSTRACT

According to one embodiment, a display device includes a first substrate, a second substrate opposed to the first substrate, and a display function layer, wherein the first substrate comprises an insulating substrate, a color filter layer includes a first color filter provided above the insulating substrate, and a second color filter provided above the insulating substrate and arranged in alignment with the first color filter, and a first inorganic insulating film which is in contact with a top surface of the first color filter, a first side surface of the first color filter opposed to the second color filter, and an under surface of the second color filter.

5 Claims, 12 Drawing Sheets

(56) References Cited

U.S. PATENT DOCUMENTS

| | | | |
|---|---|---|---|
| 2009/0011567 A1* | 1/2009 | Li | G02F 1/133707 |
| | | | 438/401 |
| 2013/0314652 A1* | 11/2013 | Ryu | G02F 1/133514 |
| | | | 349/106 |
| 2014/0347611 A1* | 11/2014 | Kim | G02F 1/133514 |
| | | | 349/106 |
| 2016/0033814 A1* | 2/2016 | Na | G02F 1/133305 |
| | | | 349/106 |
| 2016/0047690 A1* | 2/2016 | Yun | G01J 1/0492 |
| | | | 250/206 |

* cited by examiner

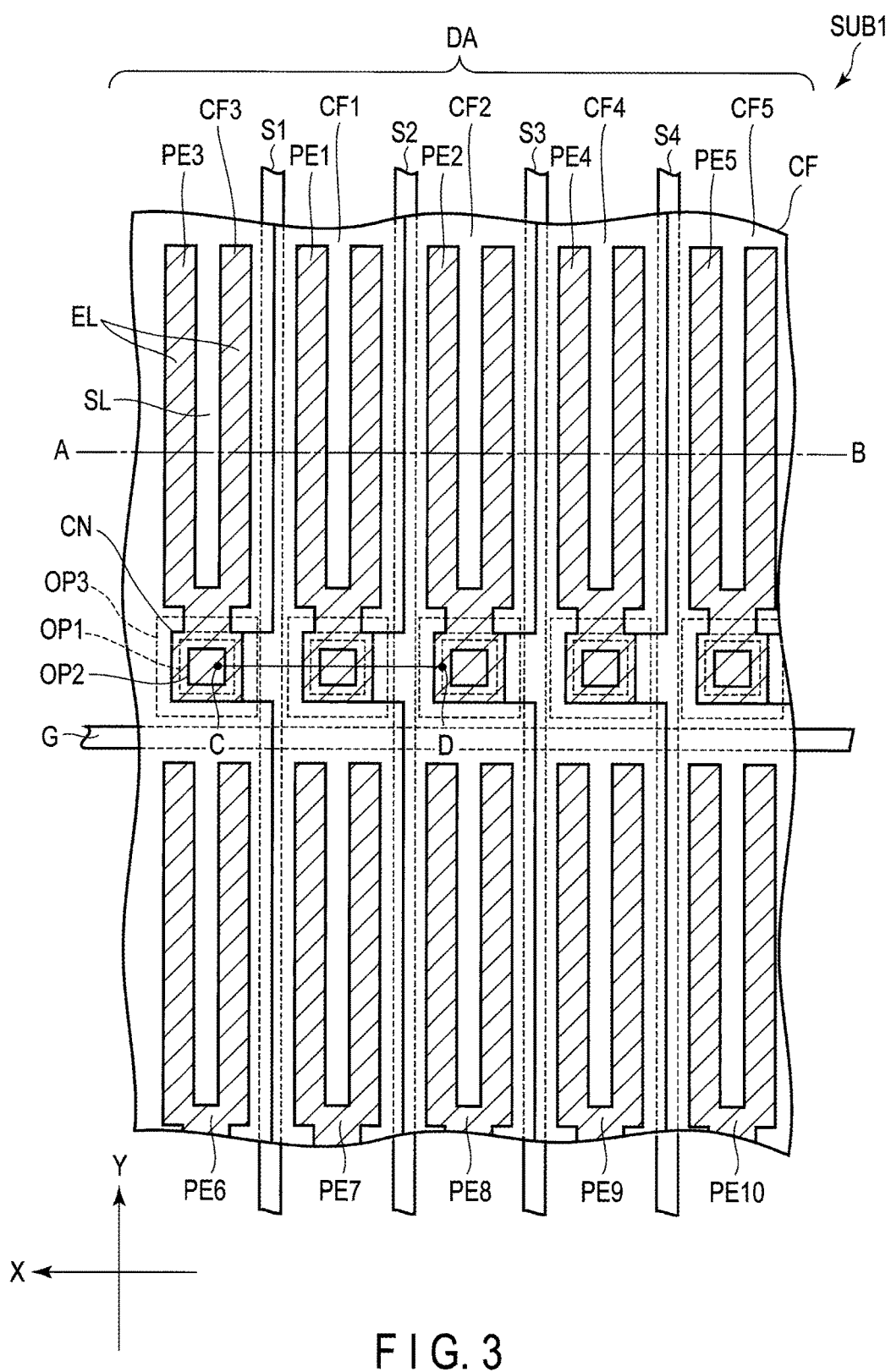
F I G. 3

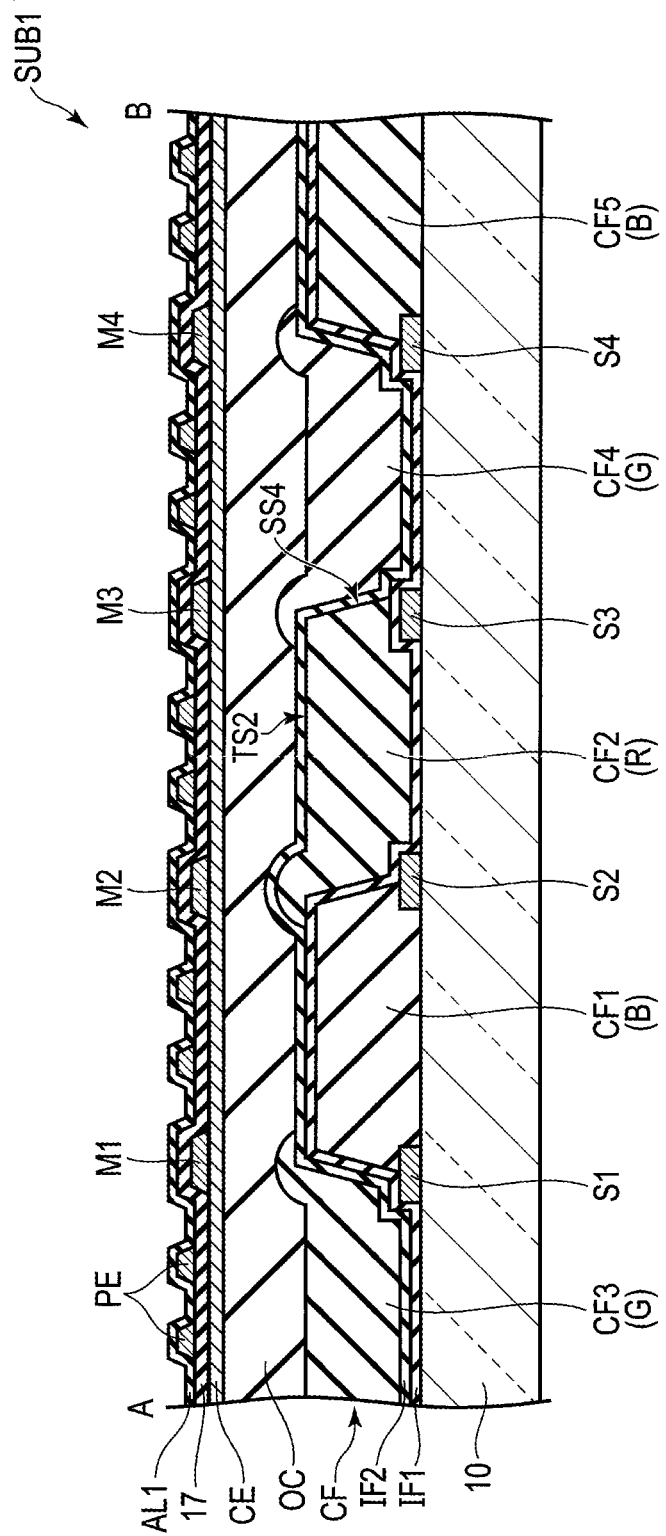
F I G. 7

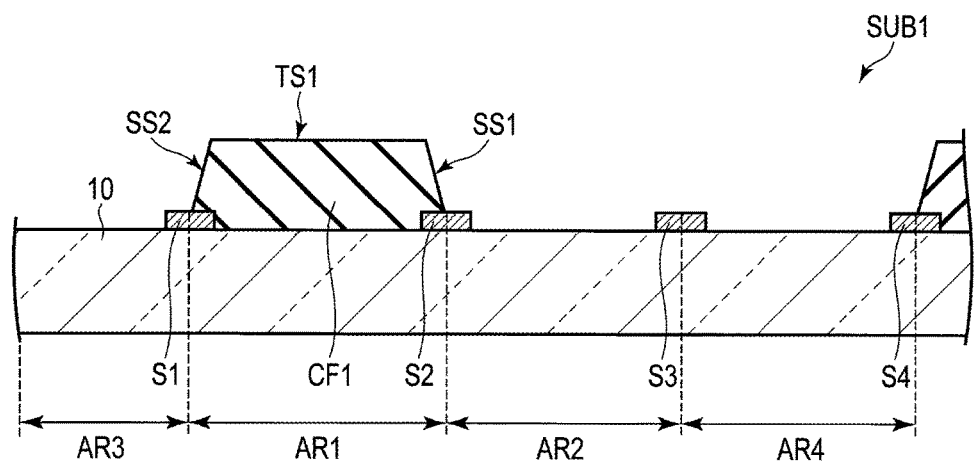
F I G. 10
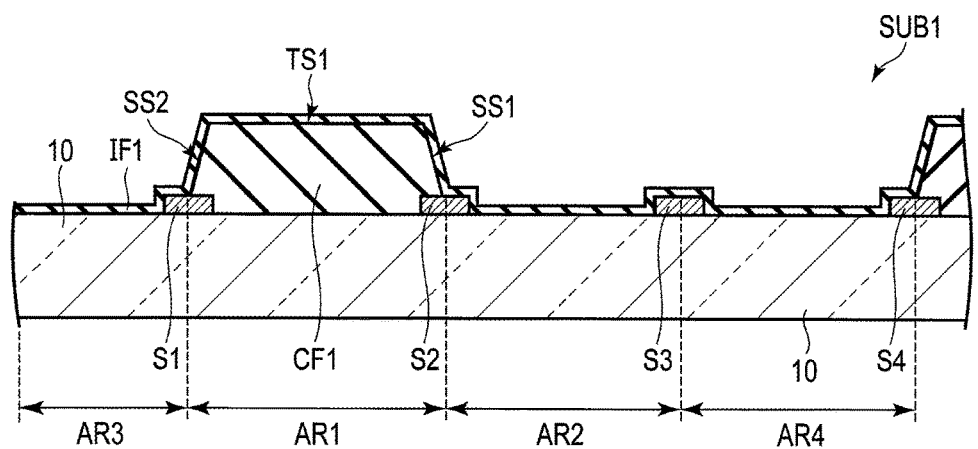
F I G. 11

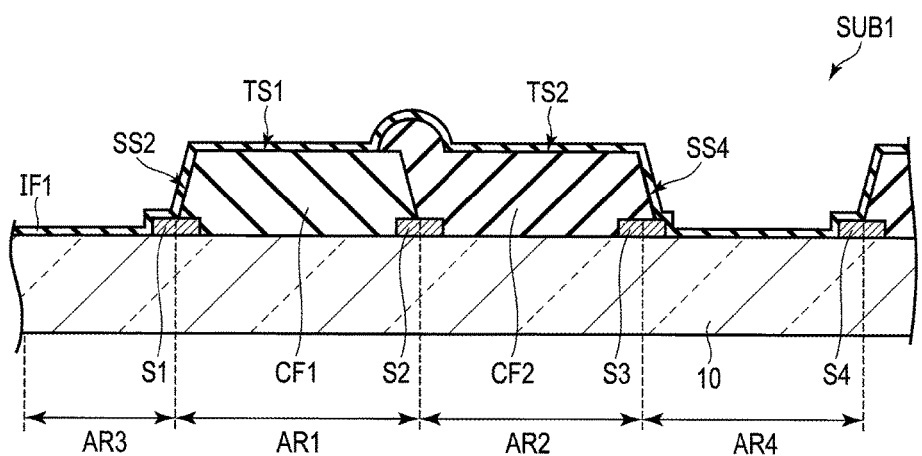
F I G. 14
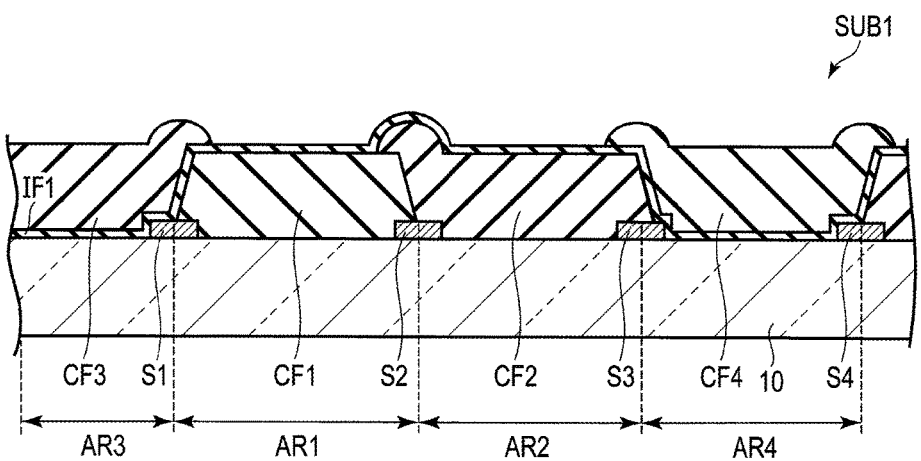
F I G. 15

DISPLAY DEVICE, METHOD FOR MANUFACTURING DISPLAY DEVICE AND COLOR FILTER SUBSTRATE

CROSS-REFERENCE TO RELATED APPLICATIONS

This application is based upon and claims the benefit of priority from Japanese Patent Application No. 2016-154357, filed Aug. 5, 2016, the entire contents of which are incorporated herein by reference.

FIELD

Embodiments described herein relate generally to a display device, a method for manufacturing a display device, and a color filter substrate.

BACKGROUND

In recent years, display devices such as liquid crystal display devices have been used in various fields. As liquid crystal display devices, for example, a technology for providing a color filter layer in an array substrate to prevent reduction in the aperture ratio due to misalignment between the array substrate and a counter-substrate or reduction in display quality due to color mixture is known. Further, a technology for covering a black matrix and a color filter layer with an insulating film to prevent elution of impurities from the black matrix and the color filter layer to a liquid crystal layer has been suggested.

BRIEF DESCRIPTION OF THE DRAWINGS

FIG. 3 is a plan view showing a structure of the first substrate shown in FIG. 1.

FIG. 7 is a cross-sectional view showing another structure of the display panel along line A-B of FIG. 3.

FIG. 10 is a cross-sectional view shown for explaining a step for forming a first color filter above a first insulating substrate.

FIG. 11 is a cross-sectional view shown for explaining a step for forming the first inorganic insulating film.

FIG. 14 is a cross-sectional view shown for explaining a step for forming the first inorganic insulating film.

FIG. 15 is a cross-sectional view shown for explaining a step for forming the third color filter and the fourth color filter.

DETAILED DESCRIPTION

Figure 1:
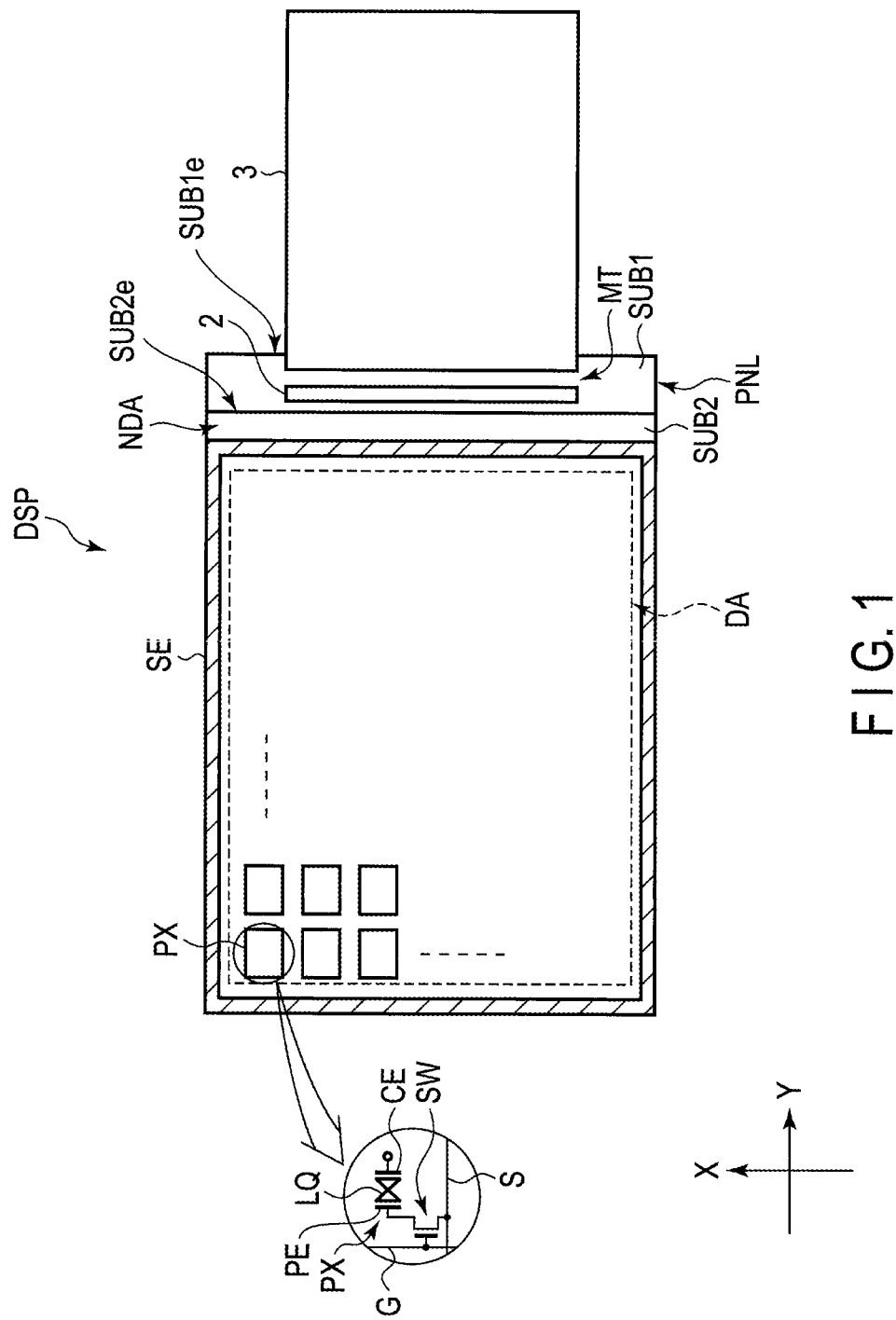
FIG. 1 is a plan view showing a structure of a display device according to an embodiment.

In general, according to an embodiment, a display device comprising: a first substrate; a second substrate opposed to the first substrate; and a display function layer; wherein the first substrate comprises: an insulating substrate; a color filter layer comprising a first color filter provided above the insulating substrate, and a second color filter provided above the insulating substrate and arranged in alignment with the first color filter; and a first inorganic insulating film which is in contact with a top surface of the first color filter, a first side surface of the first color filter opposed to the second color filter, and an under surface of the second color filter.

According to an embodiment, a color filter substrate comprising: an insulating substrate; a color filter layer comprising a first color filter provided above the insulating substrate, and a second color filter provided above the insulating substrate and arranged in alignment with the first color filter; and a first inorganic insulating film which is in contact with a top surface of the first color filter, a side surface of the first color filter opposed to the second color filter, and an under surface of the second color filter.

According to an embodiment, a display device comprising: a first substrate; a second substrate opposed to the first substrate; and a display function layer; wherein the first substrate comprises: an insulating substrate; a color filter layer comprising a first color filter provided above the insulating substrate, a second color filter provided above the insulating substrate and arranged in alignment with the first color filter, a third color filter provided above the insulating substrate and arranged in alignment with the first color filter on a side opposite to the second color filter side, and a fourth color filter provided above the insulating substrate and arranged in alignment with the second color filter on a side opposite to the first color filter side; and a first inorganic insulating film, the first color filter comprises a first side surface opposed to the second color filter, and a second side surface opposed to the third color filter, the second color filter comprises a third side surface opposed to the first color filter, and a fourth side surface opposed to the fourth color filter, and the first inorganic insulating film is in contact with a top surface of the first color filter, a top surface and the fourth side surface of the second color filter, and an under surface of the fourth color filter, and the third side surface is in contact with the first side surface.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

The main structures disclosed in the embodiments are applicable to liquid crystal display devices, self-luminous display devices such as organic electroluminescent display devices, electronic paper display devices comprising an electrophoretic element, etc., display devices to which micro-electromechanical systems (MEMS) are applied, display devices to which electrochromism is applied, etc.

A display device DSP is explained in detail according to an embodiment.

FIG. 1 is a plan view showing a structure of the display device DSP according to the present embodiment. In the present embodiment, the display device DSP is assumed to be a liquid crystal display device.

FIG. 1 shows a plan view of a display panel PNL in an X-Y plane defined by first and second directions X and Y intersecting each other. In the example of FIG. 1, the first direction X and the second direction Y are orthogonal to each other. However, they may intersect at an angle other than 90°.

The display panel PNL comprises a first substrate SUB1, a second substrate SUB2 facing the first substrate SUB1, and a liquid crystal layer LQ held between the first substrate SUB1 and the second substrate SUB2. The first substrate SUB1 is attached to the second substrate SUB2 with a sealing material SE such that a predetermined cell gap is defined between the first substrate SUB1 and the second substrate SUB2. The liquid crystal layer LQ is held on the inner side surrounded by the sealing material SE in the cell gap between the first substrate SUB1 and the second substrate SUB2. The display panel PNL comprises a display area DA which displays an image on the inner side surrounded by the sealing material SE. The display area DA is, for example, substantially rectangular. A plurality of pixels PX are arranged in matrix in the display area DA. The display area DA may have another multangular shape. The edge of the display area DA may be curved.

In the display area DA, the first substrate SUB1 comprises scanning lines G extending in the first direction X, signal lines S extending in the second direction Y, a switching element SW electrically connected to a scanning line G and a signal line S in each pixel PX, a pixel electrode PE electrically connected to a switching element SW in each pixel PX, etc. A common electrode CE is provided on the first substrate SUB1 or the second substrate SUB2, and faces the pixel electrodes PE.

Explanation of the detailed structure of the display panel PNL is omitted. In a mode using a longitudinal electric field along the normal of the main surface of each substrate parallel to X-Y plane, such as a twisted nematic (TN) mode, a polymer dispersed liquid crystal (PDLC) mode, an optically compensated bend (OCB) mode, an electrically controlled birefringence (ECB) mode or a vertical aligned (VA) mode, or a display mode using an inclined electric field obliquely inclined with respect to the main surface of each substrate, the pixel electrodes PE are provided on the first substrate SUB1 while the common electrode CE is provided on the second substrate SUB2. In a mode using a lateral electric field along the main surface of each substrate such as an in-plane switching (IPS) mode or a fringe field switching (FFS) mode, which is one of the IPS modes, both the pixel electrodes PE and the common electrode CE are provided on the first substrate SUB1. Further, the display panel PNL may comprise a structure corresponding to a display mode which appropriately combines a longitudinal electric field, a lateral electric field and an inclined electric field.

The display panel PNL may be structured as a transmissive type panel, which displays an image by selectively transmitting light from a backlight unit provided on the rear side of the display panel PNL, a reflective type panel, which displays an image by selectively reflecting external light made incident on the display panel PNL, or a transflective type panel, which is prepared by combining a transmissive type and a reflective type.

Signal supply sources necessary to drive the display panel PNL such as a driver IC chip 2 and a flexible printed circuit (FPC) board 3 are located in a non-display area NDA which has a frame shape surrounding the display area DA. In the example of FIG. 1, the driver IC chip 2 and the FPC board 3 are mounted in a mounting portion MT provided on the first substrate SUB1 extending outward from a substrate side edge SUB2e of the second substrate SUB2. The mounting portion MT is formed along a substrate side edge SUB1e of the first substrate SUB1. Although not described in detail, the first substrate SUB1 comprises a pad for connecting the signal supply sources to the mounting portion MT. The pad includes elements electrically connected to the scanning lines G and the signal lines S. In the example of FIG. 1, the three substrate side edges of the second substrate SUB2 other than substrate side edge SUB2e face the three substrate side edges of the first substrate SUB1 other than substrate side edge SUB1e.

Figure 2:
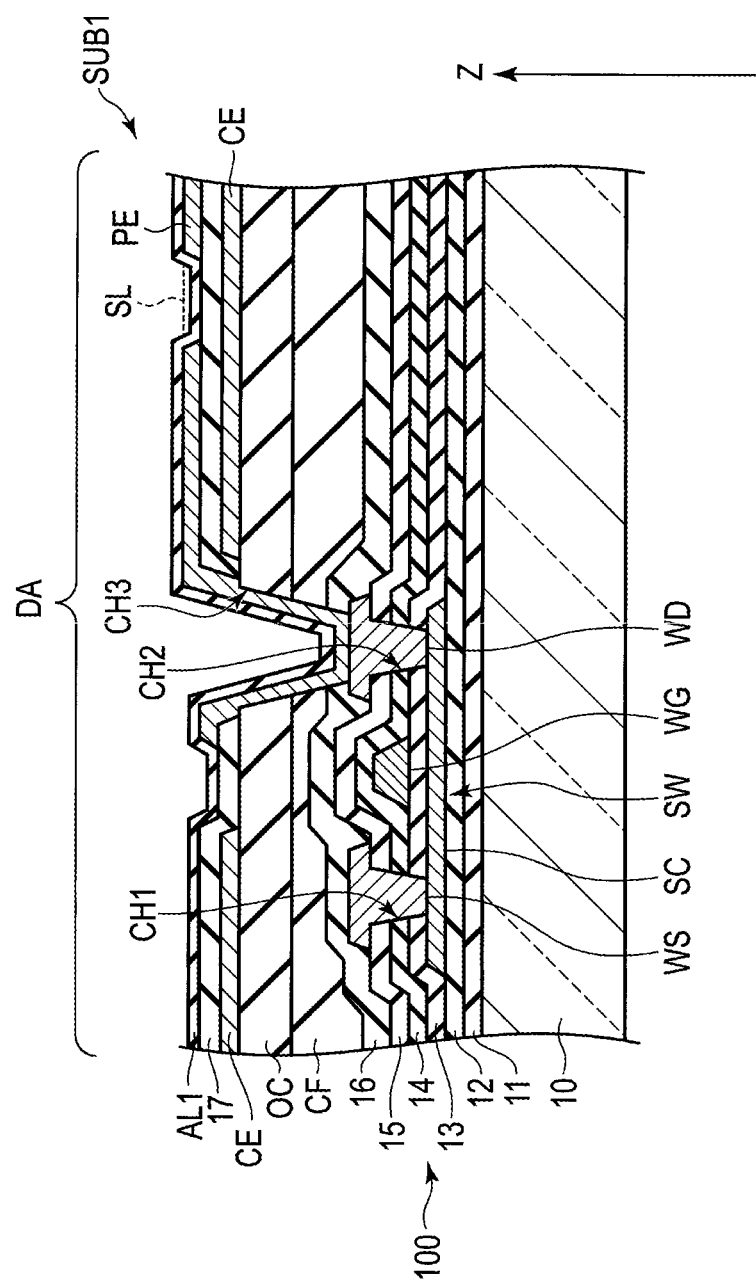
FIG. 2 is a cross-sectional view showing a structure in a display area of a first substrate shown in FIG. 1.

FIG. 2 is a cross-sectional view showing a structure in the display area DA of the first substrate SUB1 shown in FIG. 1. In FIG. 2, a third direction Z is a direction perpendicular to the first direction X and the second direction Y. In the example of FIG. 2, the first substrate SUB1 comprises the pixel electrode PE and the common electrode CE. The example of FIG. 2 shows a case where the display device is applied to a mode using a lateral electric field along the main surface of each substrate.

In the present embodiment, the third direction Z is defined as upward or an upper side. The opposite direction of the third direction Z is defined as downward or a lower side. When this specification uses the phrases "a second member above a first member" and "a second member under a first member", the second member may be in contact with the first member, or may be separated from the first member. In the latter case, a third member may be interposed between the first member and the second member. When this specification uses the phases "a second member on a first member" and "a second member directly under a first member", the second member is in contact with the first member.

The first substrate SUB1 comprises a first insulating substrate 10, the switching element SW, a color filter layer CF, the common electrode CE, the pixel electrode PE, a first alignment film AL1, etc.

The first insulating substrate 10 is formed of, for example, a phototransmissive insulating material such as glass or resin. A first insulating film 11 covers the upper side of the first insulating substrate 10. A second insulating film 12 covers the upper side of the first insulating film 11.

The switching element SW is provided above the first insulating substrate 10. The switching element SW comprises a semiconductor layer SC, a gate electrode WG, a source electrode WS, a drain electrode WD, etc. The semiconductor layer SC is provided on the second insulating film 12. A third insulating film 13 is provided on the semiconductor layer SC and the second insulating film 12. The gate electrode WG is provided on the third insulating film 13. A fourth insulating film 14 is provided on the third insulating film 13 and the gate electrode WG. A fifth insulating film 15 is provided on the fourth insulating film 14. The source electrode WS and the drain electrode WD are provided on the fifth insulating film 15, and are connected to the semiconductor layer SC through contact holes CH1 and CH2 penetrating the third insulating film 13, the fourth insulating film 14 and the fifth insulating film 15.

In the example of FIG. 2, the switching element SW is a top-gate thin-film transistor having a single-gate structure. However, the switching element SW may have a double-gate structure, or may be a bottom-gate thin-film transistor.

A sixth insulating film 16 is provided on the source electrode WS, the drain electrode WD and the fifth insulating film 15. The color filter layer CF is provided on the sixth insulating film 16. An overcoat layer OC is provided on the color filter layer CF. The common electrode CE is provided on the overcoat layer OC. A seventh insulating film 17 is provided on the common electrode CE and the overcoat layer OC. The pixel electrode PE is provided on the seventh insulating film 17, and is electrically connected to the drain electrode WD of the switching element SW through a contact hole CH3 penetrating the sixth insulating film 16, the color filter CF, the overcoat layer OC and the seventh insulating film 17. The pixel electrode PE comprises a slit SL located above the common electrode CE. The first alignment film AL1 is provided on the pixel electrode PE and the seventh insulating film 17.

The common electrode CE and the pixel electrode PE are formed of a transparent conductive material such as indium tin oxide (ITO) or indium zinc oxide (IZO).

The first insulating film 11, the second insulating film 12, the third insulating film 13, the fourth insulating film 14, the fifth insulating film 15, the sixth insulating film 16 and the seventh insulating film 17 correspond to an inorganic insulating film, and are formed of an organic material such as silicon oxide (SiO) or silicon nitride (SiN). The overcoat layer OC corresponds to an organic insulating film, and is formed of an organic material such as various types of resin. The overcoat layer OC has a film thickness greater than that of each of the first insulating film 11, the second insulating film 12, the third insulating film 13, the fourth insulating film 14, the fifth insulating film 15, the sixth insulating film 16 and the seventh insulating film 17.

As described later, in the present embodiment, the color filter layer CF comprises color filters of different colors. The first substrate SUB1 comprises a single or a plurality of inorganic insulating films in contact with the upper, lower and side surfaces of each color filter. However, the illustration of the inorganic insulating films is omitted in FIG. 2.

FIG. 3 is a plan view showing a structure of the first substrate SUB1 shown in FIG. 1.

As shown in FIG. 3, the first substrate SUB1 comprises a scanning line G, signal lines S1 to S4, the color filter layer CF, pixel electrodes PE1 to PE10, etc.

The scanning line G extends in the first direction X. Signal lines S1 to S4 extend in the second direction Y, and are arranged at intervals in the first direction X. The scanning line G intersects signal lines S1 to S4 in X-Y plane. Here, signal lines S1 to S4 linearly extend in the second direction Y. However, signal lines S1 to S4 may be bent.

In the example of FIG. 3, the color filter layer CF comprises a first color filter CF1, a second color filter CF2, a third color filter CF3, a fourth color filter CF4 and a fifth color filter CF5. The fifth color filter CF5, the fourth color filter CF4, the second color filter CF2, the first color filter CF1 and the third color filter CF3 are arranged in this order in the first direction X. The first to fifth color filters CF1 to CF5 extend in the second direction Y, and are shaped like a band. The first substrate SUB1 comprises a first opening portion OP1 between adjacent first to fifth color filters CF1 to CF5. As described later, the first opening portion OP1 penetrates the color filter layer CF.

Pixel electrode PE5, pixel electrode PE4, pixel electrode PE2, pixel electrode PE1 and pixel electrode PE3 are arranged in this order at intervals in the first direction X. Pixel electrode PE10, pixel electrode PE9, pixel electrode PE8, pixel electrode PE7 and pixel electrode PE6 are arranged in this order at intervals in the first direction X. Pixel electrodes PE3 and PE6 are located on the left side of signal line S1, and are spaced from each other across the intervening scanning line G in the second direction Y. Pixel electrodes PE1 and PE7 are located between signal lines S1 and S2, and are spaced from each other across the intervening scanning line G in the second direction Y. Pixel electrodes PE2 and PE8 are located between signal lines S2 and S3, and are spaced from each other across the intervening scanning line G in the second direction Y. Pixel electrodes PE4 and PE9 are located between signal lines S3 and S4, and are spaced from each other across the intervening scanning line G in the second direction Y. Pixel electrodes PE5 and PE10 are located on the right side of signal line S4, and are spaced from each other across the intervening scanning line G in the second direction Y.

Here, this specification particularly looks at and explains the structure of pixel electrode PE3. Pixel electrode PE3 comprises electrode portions EL, a slit SL provided between the electrode portions EL, and a connective portion CN. As described later, the connective portion CN of pixel electrode PE3 is connected to the switching element via a second opening portion OP2 penetrating a single or a plurality of inorganic insulating films. Pixel electrodes PE1, PE2 and PE4 to PE10 have the same structure as pixel electrode PE3. The number of electrode portions EL or the number of slits SL in each pixel electrode is not particularly limited.

As described later, the first substrate SUB1 comprises a third opening portion OP3 penetrating the common electrode. The first opening portion OP1 and the second opening portion OP2 are provided in the third opening portion OP3. As described later, metal lines (not shown) may be provided at positions overlapping signal lines S1 to S4.

Figure 4:
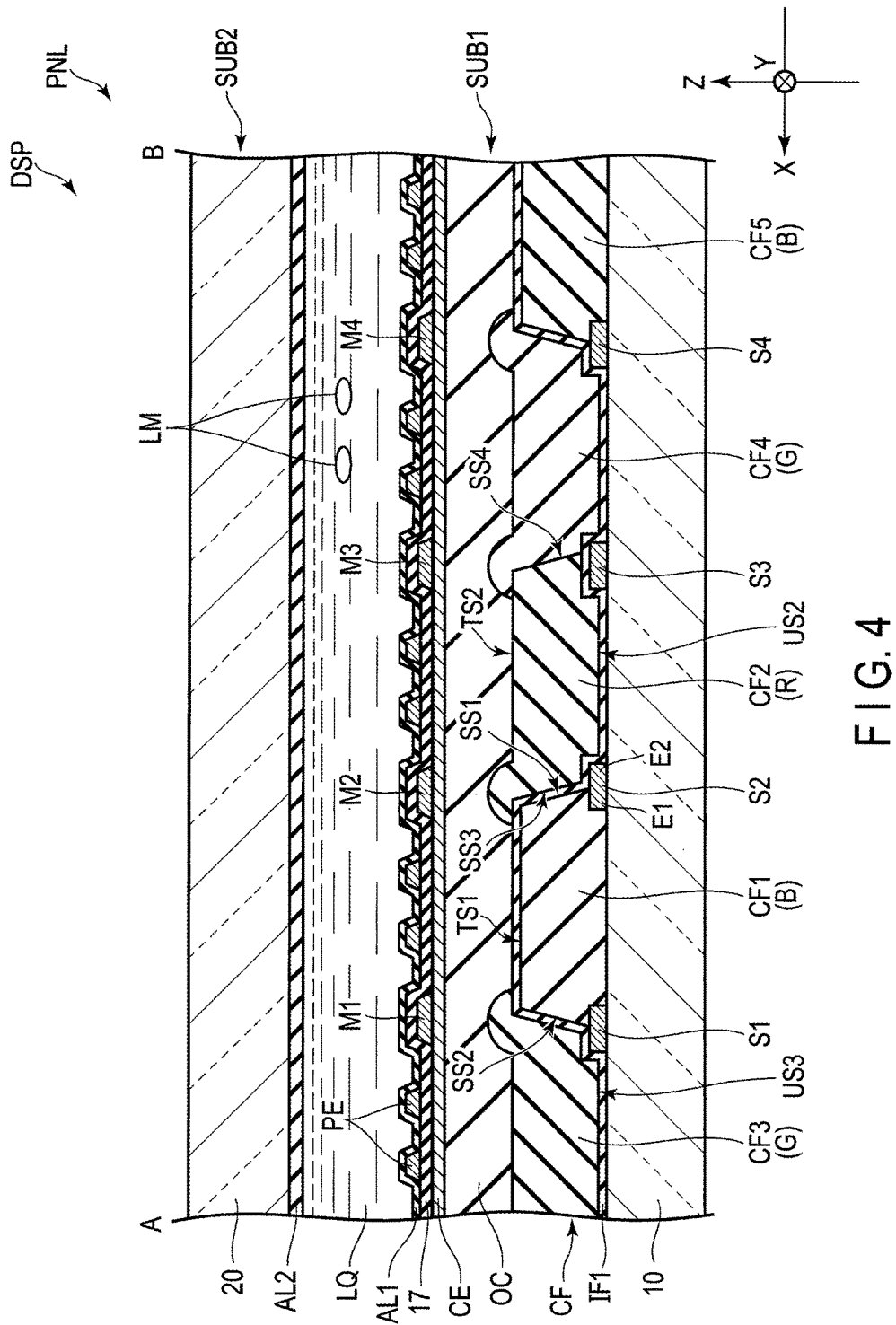
FIG. 4 is a cross-sectional view showing a structure of a display panel along line A-B of FIG. 3.

FIG. 4 is a cross-sectional view showing a structure of the display panel PNL along line A-B of FIG. 3. In addition to the above structures, the first substrate SUB1 comprises a first inorganic insulating film IF1 and metal lines M1 to M4. FIG. 4 shows only the main elements of the present embodiment. A plan view is defined as appearance when the first substrate SUB1 is seen from the second substrate SUB2.

The display device DSP comprises the first substrate SUB1, the second substrate SUB2 facing the first substrate SUB1, and the liquid crystal layer LQ provided between the first substrate SUB1 and the second substrate SUB2. The liquid crystal layer LQ corresponds to a display function layer.

The first to fifth color filters CF1 to CF5 are provided above the first insulating substrate 10. The second color filter CF2 is arranged in alignment with the first color filter CF1 in the first direction X. The third color filter CF3 is arranged in alignment with the first color filter CF1 on a side opposite to the second color filter CF2 side in the first direction X. The fourth color filter CF4 is arranged in alignment with the second color filter CF2 on a side opposite to the first color filter CF1 side in the first direction X. The fifth color filter CF5 is arranged in alignment with the fourth color filter CF4 on a side opposite to the second color filter CF2 side in the first direction X.

The first to fifth color filters CF1 to CF5 are formed of, for example, resin colored with red, blue and green materials. The color material applied to resin is not particularly limited. For example, pigment or dye may be employed. When pigment is used for the color material, it is possible to obtain a color filter excellent in durability. When dye is used for the color material, it is possible to obtain a color filter having a high light transmittance, and thus, the luminance of the pixels can be improved. The color filter layer CF is not limited to the specific colors. The color filter layer CF may comprise another color filter such as a white color filter (an uncolored filter).

In the present embodiment, the first and fifth color filters CF1 and CF5 correspond to the same color, for example, blue (B). The third and fourth color filters CF3 and CF4 correspond to the same color, for example, green (G). The second color filter CF2 corresponds to, for example, red (R).

One of the first to third color filters CF1 to CF3 may be a white (W) color filter. Alternatively, an uncolored resin material or an overcoat layer may be provided at one of the positions of the first to third color filters CF1 to CF3 without providing the color filter.

The first color filter CF1 comprises a top surface TS1 facing the second substrate SUB2, a first side surface SS1 facing the second color filter CF2, and a second side surface SS2 facing the third color filter CF3. The second color filter CF2 comprises a top surface TS2 facing the second substrate SUB2, a third side surface SS3 facing the first color filter CF1, a fourth side surface SS4 facing the fourth color filter CF4, and an under surface US2 facing the first insulating substrate 10. The third side surface SS3 faces the first side surface SS1. The third color filter CF3 comprises an under surface US3 facing the first insulating substrate 10.

In the example of FIG. 4, the first inorganic insulating film IF1 covers the first color filter CF1. The first inorganic insulating film IF1 is in contact with top surface TS1 of the first color filter CF1, the first side surface SS1 of the first color filter CF1, and under surface US2 of the second color filter CF2. The first inorganic insulating film IF1 is in contact with the second side surface SS2 of the first color filter CF1 and under surface US3 of the third color filter CF3. The first inorganic insulating film IF1 is continuously provided on under surface US2, the first side surface SS1, top surface TS1, the second side surface SS2 and under surface US3. Similarly, the first inorganic insulating film IF1 covers the fifth color filter CF5.

The first inorganic insulating film IF1 is formed of an inorganic material such as SIC or SiN. When the first inorganic insulating film IF1 is formed of SiN, the density is higher than that when the first inorganic insulating film IF1 is formed of SiO. When the first inorganic insulating film IF1 is formed of SiO, the optical property of the first color filter CF1 is less affected by the first inorganic insulating film IF1 than a case where the first inorganic insulating film IF1 is formed of SiN.

Signal lines S1 to S4 are provided between the color filter layer CF and the first insulating substrate 10. Signal lines S1 to S4 function as light-shielding members to block light. When this specification particularly looks at signal line S2, signal line S2 comprises an end portion E1 overlapping the first color filter CF1, and the other end portion E2 overlapping the second color filter CF2. Signal line S2 is covered with the first color filter CF1 in end portion E1, and is covered with the first inorganic insulating film IF1 in end portion E2. The first inorganic insulating film IF1 is interposed between the second color filter CF2 and signal line S2. In the example of FIG. 4, the first inorganic insulating film IF1 is also interposed between the second color filter CF2 and signal line S3. Neither signal line S2 nor signal line S3 is in contact with the second color filter CF2.

The overcoat layer OC is in contact with the third color filter CF3, the second color filter CF2 and the fourth color filter. The overcoat layer OC is in contact with the first inorganic insulating film IF1 above the first color filter CF1 and the fifth color filter CF5.

Metal lines M1 to M4 are provided on the common electrode CE. Metal lines M1 to M4 are provided at positions facing signal lines S1 to S4, respectively. The seventh insulating film 17 covers metal lines M1 to M4.

The second substrate SUB2 comprises a second insulating substrate 20 and a second alignment film AL2. The second insulating substrate 20 is formed of, for example, a phototransmissive insulating material such as glass or resin. The second alignment film AL2 is provided directly under the second insulating substrate 20. A horizontal alignment film or a vertical alignment film is appropriately applied to the first alignment film AL1 and the second alignment film AL2 in accordance with the display mode of the liquid crystal display device.

The liquid crystal layer LQ is provided between the first alignment film AL1 and the second alignment film AL2. The liquid crystal molecules LM contained in the liquid crystal layer LQ are initially aligned by the alignment restriction force from the first alignment film AL1 and the second alignment film AL2 in a state where, for example, no electric field is formed in the liquid crystal layer LQ.

In the present embodiment, the first inorganic insulating film IF1 is interposed between the first color filter CF1 and the second color filter CF2. Further, the first inorganic insulating film IF1 is interposed between the first color filter CF1 and the third color filter CF3. Thus, it is possible to prevent the transfer of the pigment composition of the second color filter CF2 and the third color filter CF3 to the first color filter CF1 by the thermal process at the time of forming the color filter layer CF or the thermal process at the time of forming the members provided above the color filter layer CF. In this way, the color chromaticity of the first color filter CF1 is not changed.

In the present embodiment, the first inorganic insulating film IF1 is interposed between signal line S2 and the second color filter CF2. Therefore, even if the second color filter CF2 contains a component which decomposes the signal lines, the decomposition of signal line S2 can be prevented. The component which decomposes the signal lines refers to, for example, phosphoric acid. The component which decomposes the signal lines may not be contained in the color filters. For example, the signal lines may be decomposed by a dispersant or other dopants having an influence on the color filters.

In the present embodiment, the first color filter CF1 is covered with the first inorganic insulating film IF1. Thus, it is possible to prevent the oxidation of the pigment contained in the first color filter CF1 by the thermal process at the time of forming the color filter layer CF or the thermal process at the time of forming the members provided above the color filter layer CF. In this way, the color chromaticity of the first color filter CF1 is not changed.

When the present embodiment is structured in the above manner, it is possible to simultaneously achieve the effect of preventing the transfer of the pigment compositions of the second and third color filters CF2 and CF3 to the first color filter CF1, the effect of preventing the decomposition of signal line S2 by the components contained in the second color filter CF2, and the effect of preventing the oxidation of the pigment contained in the first color filter CF1.

Thus, the present embodiment realizes a display device capable of preventing the degradation of the display quality.

FIG. 4 shows a case where the pigment compositions of the second and third color filters CF2 and CF3 are easily transferred to the first color filter CF1 and a case where the second color filter CF2 contains a component which decomposes the signal lines. Other examples are explained in detail later.

Figure 5:
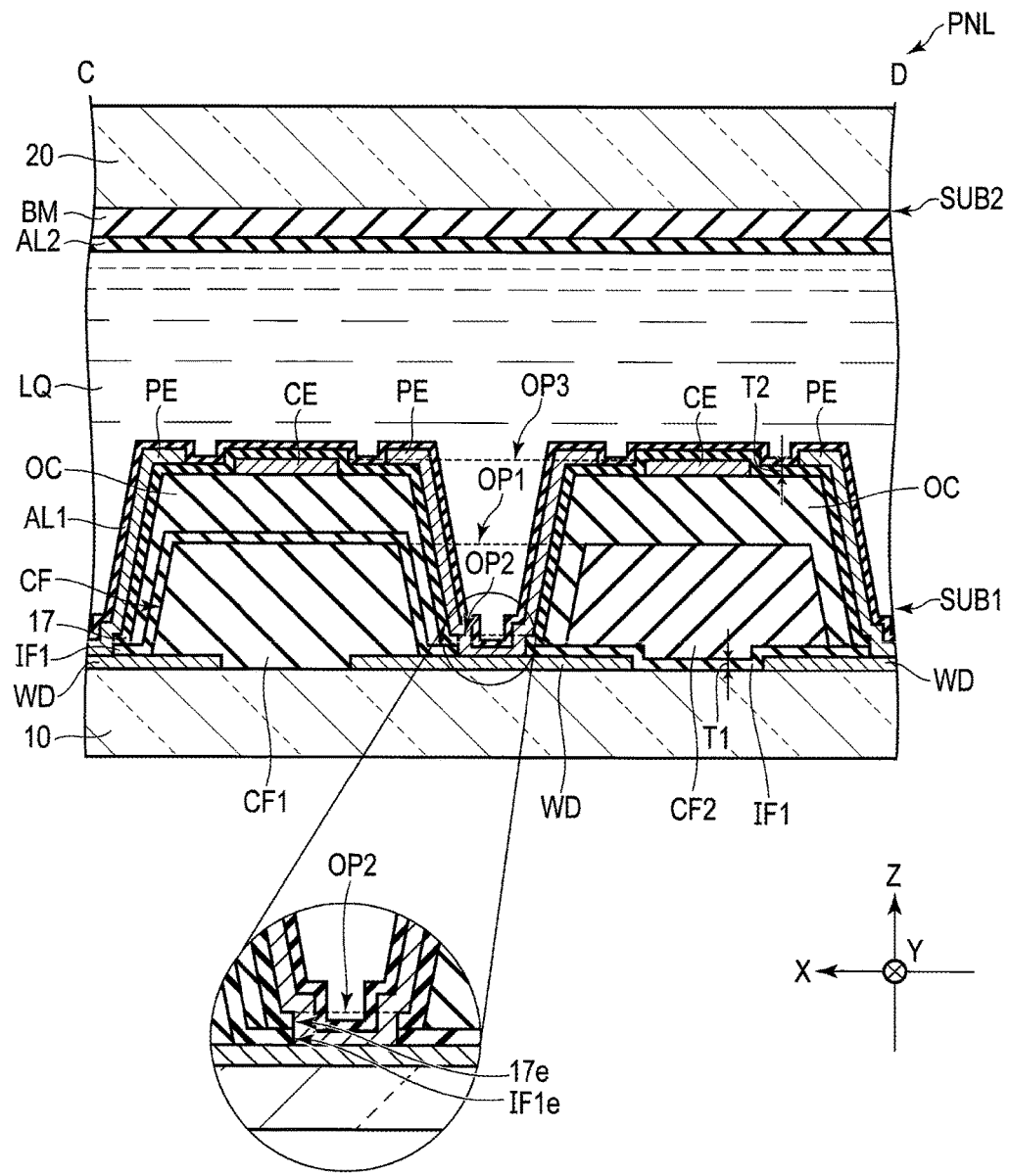
FIG. 5 is a cross-sectional view showing a structure of the display panel along line C-D of FIG. 3.

FIG. 5 is a cross-sectional view showing a structure of the display panel PNL along line C-D of FIG. 3.

The drain electrode WD is provided above the first insulating substrate 10. The first opening portion OP1 penetrating the color filter layer CF is formed between the first color filter CF1 and the second color filter CF2. The first inorganic insulating film IF1 covers the first color filter CF1, and is provided directly under the second color filter CF2. The overcoat layer OC covers the first color filter CF1 via the first inorganic insulating film IF1. The overcoat layer OC covers the second color filter CF2. The common electrode CE is provided on the overcoat layer OC, and comprises the third opening portion OP3.

The seventh insulating film 17 covers the overcoat layer OC and the common electrode CE. The seventh insulating film 17 corresponds to a third inorganic insulating film. The first inorganic insulating film IF1 is in contact with the seventh insulating film 17 in the first opening portion OP1. The second opening portion OP2 penetrates the first inorganic insulating film IF1 and the seventh insulating film 17. The second opening portion OP2 is located inside the first opening portion OP1. The second opening portion OP2 is collectively formed after the first inorganic insulating film IF1 and the seventh insulating film 17 are formed. Thus, an end portion IF1e of the first inorganic insulating film IF1 and an end portion 17e of the seventh insulating film 17 are aligned with each other in the third direction Z.

Thickness T1 of the first inorganic insulating film IF1 in the third direction Z is different from thickness T2 of the seventh insulating film 17 in the third direction Z. For example, thickness T2 is greater than thickness T1. Thickness T1 is, for example, approximately 50 nm. Thickness T2 is, for example, 140 to 150 nm.

The first inorganic film IF1 and the seventh insulating film 17 may be formed of either the same material or different materials. For example, the first inorganic insulating film IF1 may be formed of SiN, and the seventh insulating film 17 may be formed of SiO. Alternatively, the seventh insulating film 17 may be formed of SiN, and the first inorganic insulating film IF1 may be formed of SiO.

The pixel electrode PE is provided on the seventh insulating film 17. The pixel electrode PE is electrically connected to the drain electrode WD via the first opening portion OP1, the second opening portion OP2 and the third opening portion OP3.

The second substrate SUB2 comprises a light-shielding layer BM at a position overlapping the first opening portion OP1, the second opening portion OP2 and the third opening portion OP3. The second alignment film AL2 covers the light-shielding layer BM.

Figure 6:
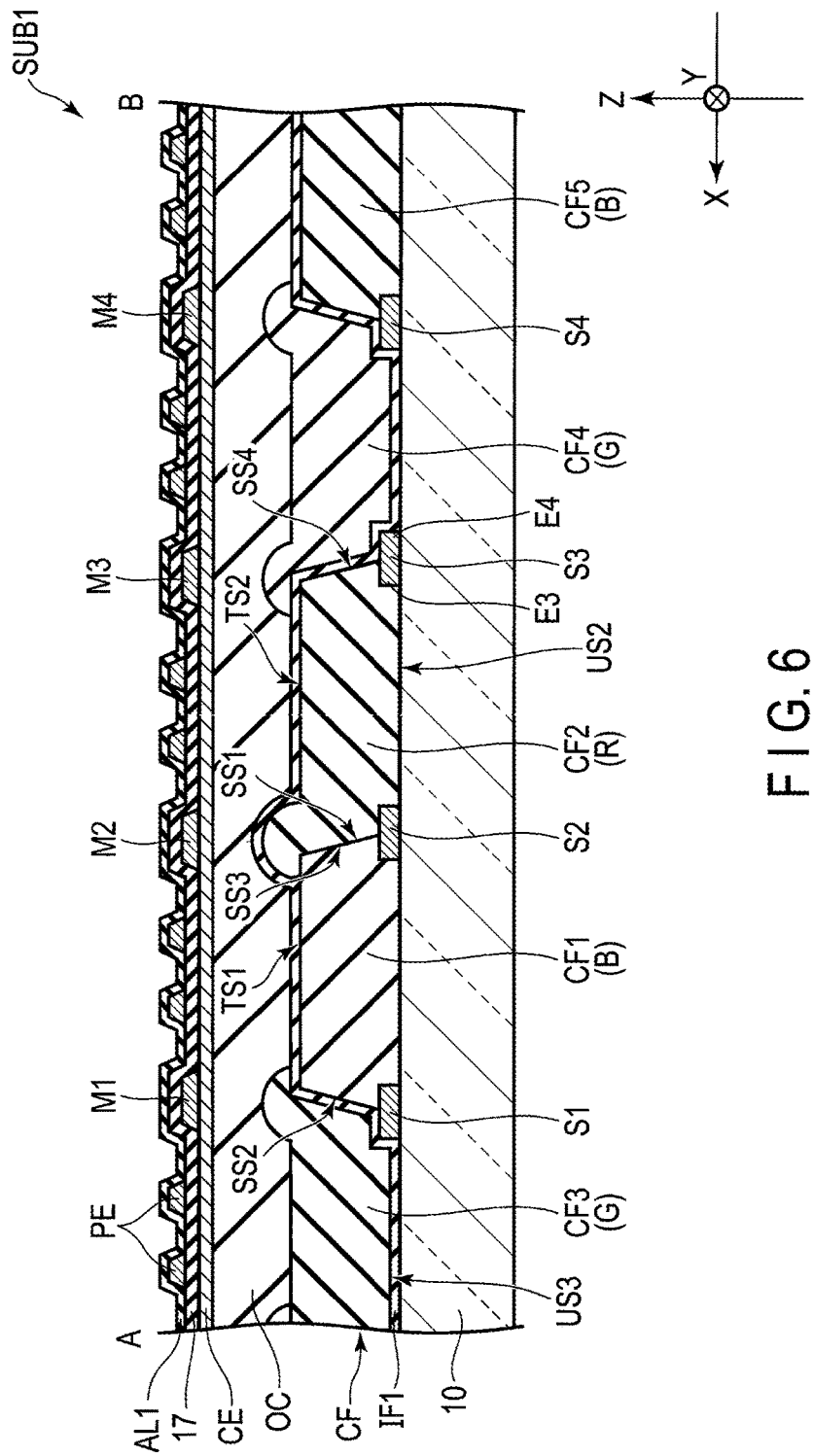
FIG. 6 is a cross-sectional view showing another structure of the display panel along line A-B of FIG. 3.

FIG. 6 is a cross-sectional view showing another structure of the display panel PNL along line A-B of FIG. 3. In FIG. 6, the first inorganic insulating film IF1 covers the first color filter CF1 and the second color filter CF2. In this respect, FIG. 6 is different from the structure of the first substrate SUB1 shown in FIG. 4.

The first inorganic insulating film IF1 is in contact with under surface US3 of the third color filter CF3, the second side surface SS2 and top surface TS1 of the first color filter CF1, and top surface TS2 and the fourth side surface SS4 of the second color filter CF2.

FIG. 6 shows a case where the pigment composition of the first color filter CF1 is easily transferred to the third color filter CF3, and the pigment composition of the second color filter CF2 is easily transferred to the fourth color filter CF4. FIG. 6 also shows a case where the third color filter CF3 and the fourth color filter CF4 contain a component which decomposes the signal lines.

In the example of FIG. 6, the first inorganic insulating film IF1 is interposed between the first color filter CF1 and the third color filter CF3. The first inorganic insulating film IF1 is interposed between the second color filter CF2 and the fourth color filter CF4. Thus, it is possible to prevent the transfer of the pigment composition from the first color filter CF1 to the third color filter CF3 and the transfer of the pigment composition from the second color filter CF2 to the fourth color filter CF4.

In the present embodiment, the first inorganic film IF1 is interposed between signal line S1 and the third color filter CF3. Therefore, even if the third color filter CF3 contains a component which decomposes the signal lines, the decomposition of signal line S1 can be prevented. Similarly, it is possible to prevent the decomposition of signal lines S3 and S4 by the component of the fourth color filter CF4. When this specification particularly looks at signal line S3, signal line S3 comprises an end portion E3 overlapping the second color filter CF2, and the other end portion E4 overlapping the fourth color filter CF4. Signal line S3 is covered with the second color filter CF2 in end portion E3, and is covered with the first inorganic insulating film IF1 in end portion E4.

In the example of FIG. 6, the first color filter CF1 and the second color filter CF2 are covered with the first inorganic insulating film IF1. Thus, it is possible to prevent the oxidation of the pigment contained in the first color filter CF1 and the second color filter CF2.

Effects similar to the aforementioned effects can be achieved from this structure.

FIG. 7 is a cross-sectional view showing another structure of the display panel PNL along line A-B of FIG. 3. In FIG. 7, the first substrate SUB1 comprises a second inorganic insulating film IF2. In this respect, FIG. 7 is different from the structure of the first substrate SUB1 shown in FIG. 4.

The second inorganic insulating film IF2 is in contact with the first inorganic insulating film IF1 above the first color filter CF1, and is in contact with top surface TS2 and the fourth side surfaces SS4 of the second color filter CF2.

In addition to the state of the color filter layer CF shown in FIG. 4, FIG. 7 shows a case where the pigment component is also easily transferred between the second color filter CF2 and the fourth color filter CF4.

In the example of FIG. 7, the second inorganic insulating film IF2 is interposed between the second color filter CF2 and the fourth color filter CF4. Thus, it is possible to also prevent the transfer of the pigment component between the second color filter CF2 and the fourth color filter CF4.

In the example of FIG. 7, the second color filter CF2 is covered with the second inorganic insulating film IF2. Thus, it is possible to prevent the oxidation of the pigment contained in the second color filter CF2.

Effects similar to the aforementioned effects can be achieved from this structure.

Figure 8:
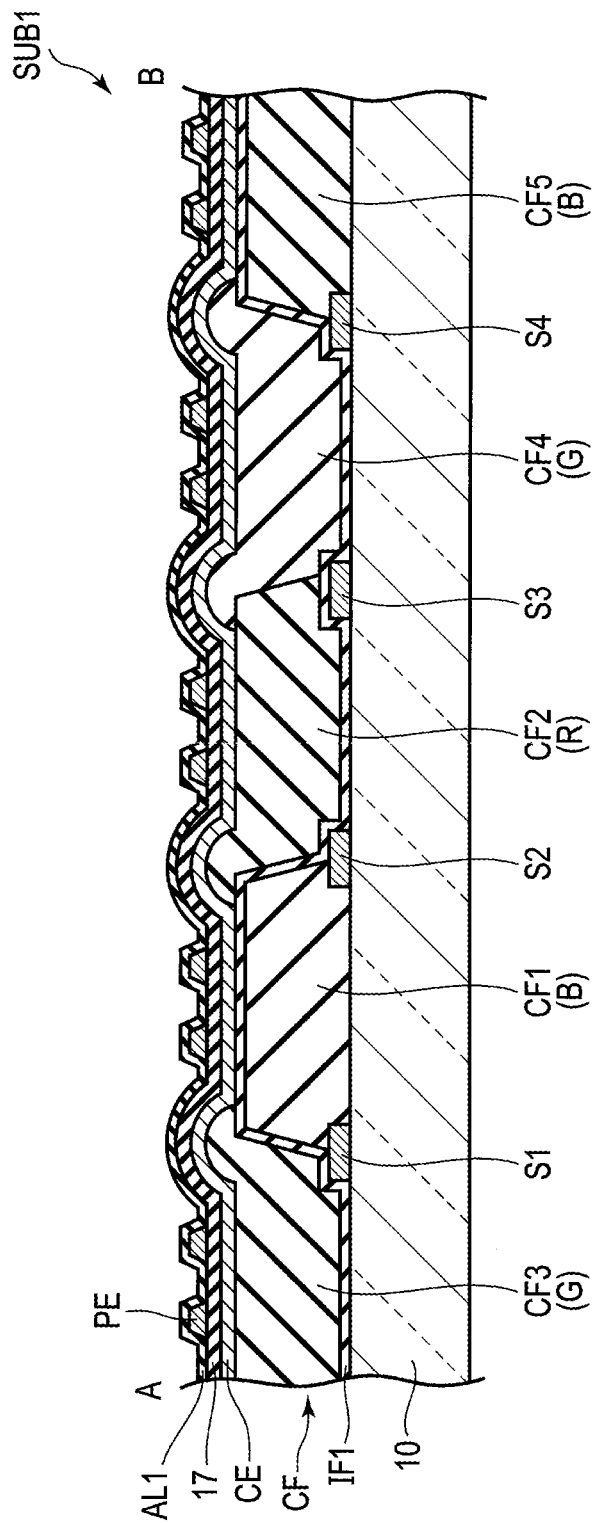
FIG. 8 is a cross-sectional view showing another structure of the display panel along line A-B of FIG. 3.

FIG. 8 is a cross-sectional view showing another structure of the display panel PNL along line A-B of FIG. 3. In FIG.

8, none of the overcoat layer OC and metal lines M1 to M4 is provided. In this respect, FIG. 8 is different from the structure of the first substrate SUB1 shown in FIG. 4.

The common electrode CE is in contact with the third color filter CF3, the second color filter CF2 and the fourth color filter CF4. The common electrode CE is in contact with the first inorganic insulating film IF1 above the first color filter CF1 and the fifth color filter CF5. Effects similar to the aforementioned effects can be achieved from this structure.

Figure 9:
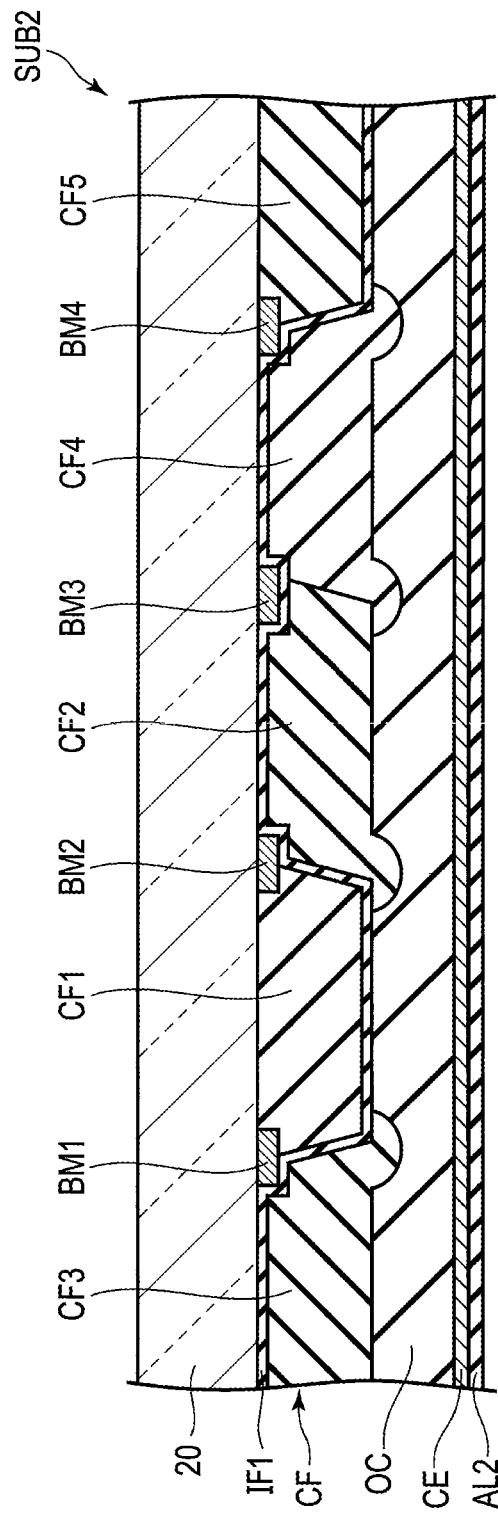
FIG. 9 is a cross-sectional view showing a structure of a second substrate when a color filter layer, a first inorganic insulating film and an overcoat layer are provided on the second substrate.

FIG. 9 is a cross-sectional view showing a structure of the second substrate SUB2 when the color filter layer CF, the first inorganic insulating film IF1 and the overcoat layer OC are provided on the second substrate SUB2. In the example of FIG. 9, the second substrate SUB2 comprises the common electrode CE. The example of FIG. 9 shows a case where the display device is applied to a mode using a longitudinal electric field along the normal of the main surface of each substrate. At this time, the second substrate SUB2 corresponds to a color filter substrate on which the color filter layer CF is provided.

Light-shielding layers BM1 to BM4 are provided directly under the second insulating substrate 20. The color filter layer CF and the first inorganic insulating film IF1 are provided under the second insulating substrate 20. The first inorganic insulating film IF1 covers the first color filter CF1 and the fifth color filter CF5. The overcoat layer OC covers the color filter layer CF and the first inorganic insulating film IF1. The common electrode CE covers the overcoat layer OC. The second alignment film AL2 covers the common electrode CE.

In the example of FIG. 9, the first inorganic insulating film IF1 is interposed between the first color filter CF1 and the second color filter CF2 and between the first color filter CF1 and the third color filter CF3 in a manner similar to that of the structure shown in FIG. 4. In this way, it is possible to prevent the transfer of the pigment compositions of the second and third color filters CF2 and CF3 to the first color filter CF1.

In the example of FIG. 9, the first inorganic insulating film IF1 is interposed between light-shielding layer BM2 and the second color filter CF2. Therefore, even if the second color filter CF2 contains a component which decomposes the light-shielding layers, the decomposition of light-shielding layer BM2 can be prevented.

In the example of FIG. 9, the first color filter CF1 is covered with the first inorganic insulating film IF1. Thus, it is possible to prevent the oxidation of the pigment contained in the first color filter CF1 in a manner similar to that of the structure shown in FIG. 4.

Effects similar to the aforementioned effects can be achieved from this structure.

Figure 12:
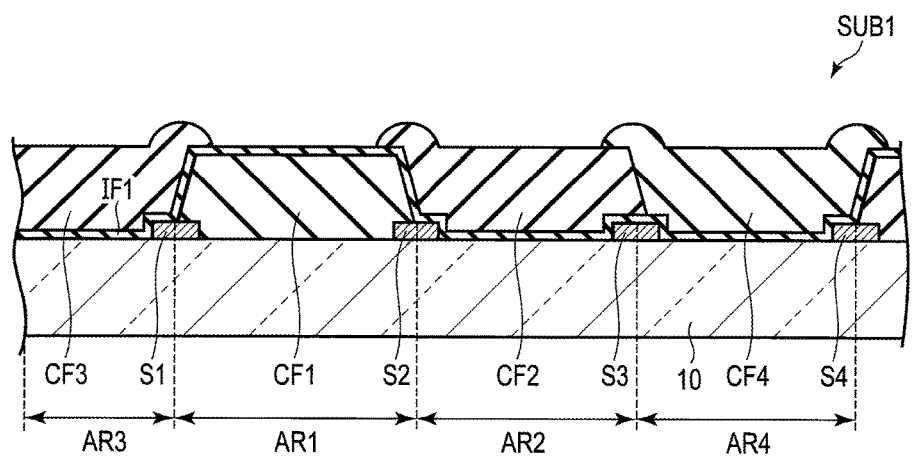
FIG. 12 is a cross-sectional view shown for explaining a step for forming a second color filter, a third color filter and a fourth color filter.

Now, this specification explains part of the process for manufacturing the first substrate SUB1 shown in FIG. 4, referring to FIG. 10 to FIG. 12.

FIG. 10 is a cross-sectional view shown for explaining a step for forming the first color filter CF1 above the first insulating substrate 10. Of the first insulating substrate 10, the area in which the first color filter CF1 is provided is defined as a first area AR1. The area in which the second color filter is provided is defined as a second area AR2. The area in which the third color filter is provided is defined as a third area AR3. The area in which the fourth color filter is provided is defined as a fourth area AR4. The second area AR2 is adjacent to the first area AR1. The third area AR3 is adjacent to the first area AR1 on a side opposite to the second area AR2. The fourth area AR4 is adjacent to the second area AR2 on a side opposite to the first area AR1.

Signal lines S1 to S4 are formed above the first insulating substrate 10. Subsequently, the first color filter CF1 is formed above the first area AR1 of the first insulating substrate 10. At this time, the first color filter CF1 comprises the first side surface SS1, the second side surface SS2 and top surface TS1.

FIG. 11 is a cross-sectional view shown for explaining a step for forming the first inorganic insulating film IF1. Subsequently, the first inorganic insulating film IF1 is formed. The first inorganic insulating film IF1 is in contact with the first side surface SS1, the second side surface SS2 and top surface TS1 of the first color filter CF1. The first inorganic insulating film IF1 is also provided above the second area AR2, the third area AR3 and the fourth area AR4.

FIG. 12 is a cross-sectional view shown for explaining a step for forming the second color filter CF2, the third color filter CF3 and the fourth color filter CF4.

Subsequently, the second color filter CF2 is formed on the first inorganic insulating film IF1 formed above the second area AR2. Subsequently, the third color filter CF3 is formed on the first inorganic insulating film IF1 formed above the third area AR3. The fourth color filter CF4 is formed on the first inorganic insulating film IF1 formed above the fourth area AR4.

As explained above, the color filter which is easily subjected to the transfer of the pigment composition is formed before the formation of the first inorganic insulating film IF1. The color filters which contain a component having an influence on the signal lines are formed after the formation of the first inorganic insulating film IF1. In this way, the above effects can be obtained.

Figure 13:
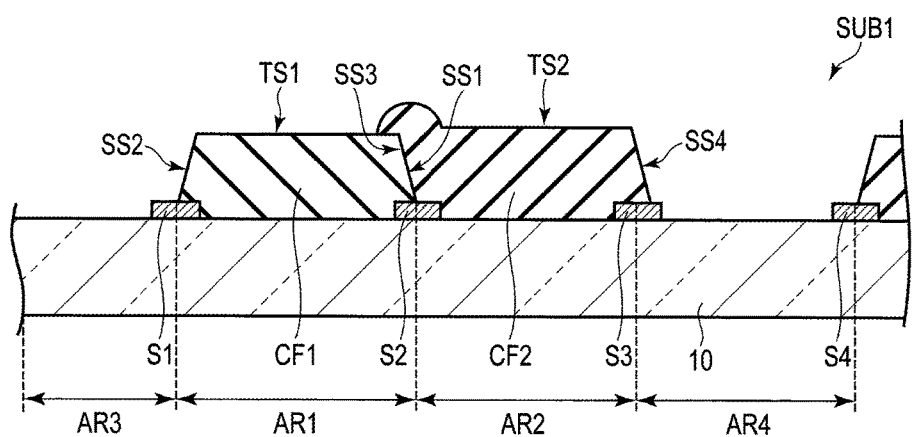
FIG. 13 is a cross-sectional view shown for explaining a step for forming the first color filter and the second color filter above the first insulating substrate.

Now, this specification explains part of the process for manufacturing the first substrate SUB1 shown in FIG. 6, referring to FIG. 13 to FIG. 15.

FIG. 13 is a cross-sectional view shown for explaining a step for forming the first color filter CF1 and the second color filter CF2 above the first insulating substrate 10.

Signal lines S1 to S4 are formed above the first insulating substrate 10. Subsequently, the first color filter CF1 is formed above the first area AR1 of the first insulating substrate 10. Subsequently, the second color filter CF2 is formed above the second area AR2 of the first insulating substrate 10. At this time, the first color filter CF1 comprises the first side surface SS1, the second side surface SS2 and top surface TS1. The second color filter CF2 comprises the third side surface SS3, the fourth side surface SS4 and top surface TS2. The first side surface SS1 is in contact with the third side surface SS3.

FIG. 14 is a cross-sectional view shown for explaining a step for forming the first inorganic insulating film IF1. Subsequently, the first inorganic insulating film IF1 is formed. The first inorganic insulating film IF1 is in contact with the second side surface SS2 and top surface TS1 of the first color filter CF1, and top surface TS2 and the fourth side surface SS4 of the second color filter CF. The first inorganic insulating film IF1 is also provided above the third area AR3 and the fourth area AR4.

FIG. 15 is a cross-sectional view shown for explaining a step for forming the third color filter CF3 and the fourth color filter CF4.

Subsequently, the third color filter CF3 is formed on the first inorganic insulating film IF1 formed above the third area AR3. The fourth color filter CF4 is formed on the first inorganic insulating film IF1 formed above the fourth area AR4.

As described above, the color filters which are hardly subjected to the transfer of the pigment compositions and contain few components having an influence on the signal lines are formed before the formation of the first inorganic insulating film IF1. The color filters which are easily subjected to the transfer of the pigment compositions and contain a component having an influence on the signal lines are formed after the formation of the first inorganic insulating film IF1. In this way, the above effects can be obtained.

In the present embodiment, as shown in FIG. 3, the color filter layer CF comprises the color filters each shaped like a stripe extending in the second direction Y. However, the color filter layer CF may comprise color filters each shaped like an island.

As explained above, the present embodiment allows provision of a display device, a method for manufacturing a display device, and a color filter substrate, capable of preventing the degradation of the display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate;
a second substrate opposed to the first substrate; and
a display function layer; wherein
the first substrate comprises:
an insulating substrate;
a color filter layer comprising a first color filter provided above the insulating substrate, a second color filter provided above the insulating substrate and arranged next to the first color filter, a third color filter provided above the insulating substrate and arranged next to the first color filter on a side opposite to the second color filter side, a fourth color filter provided above the insulating substrate and arranged next to the second color filter on a side opposite to the first color filter side, and a fifth color filter provided above the insulating substrate and arranged next to the fourth color filter on a side opposite to the second color filter side:
signal lines comprising a first signal line overlapping a boundary of the first color filter and the third color filter, a second signal line overlapping a boundary of the first color filter and the second color filter, a third signal line overlapping a boundary of the second color filter and the fourth color filter, and a fourth signal line overlapping a boundary of the fourth color filter and the fifth color filter;
a transparent common electrode overlapping the first to fifth color filters;
metal lines stacked on the transparent common electrode and including first to fifth metal lines overlapping the first to fifth signal lines;
an overcoat layer between the transparent common electrode and the color filter layer; and
a first inorganic insulating film which is in contact with an under surface of the third color filter, a part of the first signal line, one surface of the first color filter opposed to the third color filter, a top surface of the first color filter, the other surface of the first color filter opposed to the second color filter, a part of the second signal line, an under surface of the second color filter, the third source line, an under surface of the fourth color filter, a part of the fourth signal line, one surface of the fifth color filter opposed to the fourth color filter, and a top surface of the fifth color filter,
the overcoat layer is in contact with a top surface of the third color filter, a top surface of the second color filter, a top surface of the fourth color filter, and the first inorganic insulating film at positions overlapping the first and fifth color filters, and
the second color filter is in contact with the fourth color filter.

2. The display device of claim 1, wherein
the display function layer is a liquid crystal layer, and is provided between the first substrate and the second substrate.

3. The display device of claim 1, wherein the first substrate further comprises:
a switching element including a drain electrode; and
a pixel electrode electrically connected to the switching element,
wherein
the drain electrode is disposed between the first signal line and the second signal line,
the drain electrode has a first edge and a second edge opposite to the first edge,
the first edge is directly covered by the first color filter, and
the second edge is directly covered by the first inorganic insulating film.

4. The display device of claim 3, wherein
the first substrate comprises a second inorganic insulating film, and
the first substrate comprises a first opening portion penetrating the color filter layer and overlapping the drain electrode, and
the first inorganic insulating film is in contact with the second inorganic insulating film and the drain electrode in the first opening portion.

5. The display device of claim 4, further comprising a second opening portion penetrating the first inorganic insulating film and the second inorganic insulating film,
the second opening portion is located inside the first opening portion in plan view,
the second opening portion exposes the drain electrode, and
the pixel electrode is connected to the drain electrode via the second opening portion.

* * * * *